(12) United States Patent
Moltion

(10) Patent No.: US 8,872,367 B2
(45) Date of Patent: Oct. 28, 2014

(54) LIFTING SYSTEM THAT GENERATES ELECTRICAL POWER

(71) Applicant: John Michael Moltion, Lafayette, NY (US)

(72) Inventor: John Michael Moltion, Lafayette, NY (US)

( * ) Notice: Subject to any disclaimer, the term of this patent is extended or adjusted under 35 U.S.C. 154(b) by 0 days.

(21) Appl. No.: 13/972,721

(22) Filed: Aug. 21, 2013

(65) Prior Publication Data

US 2014/0054900 A1 Feb. 27, 2014

Related U.S. Application Data

(60) Provisional application No. 61/691,550, filed on Aug. 21, 2012.

(51) Int. Cl.
 F02B 63/04 (2006.01)
 H02K 53/00 (2006.01)
 H02K 7/18 (2006.01)

(52) U.S. Cl.
 CPC .............. *H02K 7/1853* (2013.01); *H02K 53/00* (2013.01)
 USPC ....................................................... 290/1 D

(58) Field of Classification Search
 USPC .......... 290/1 C, 1 D; 187/224, 233, 260, 277, 187/289, 290; 254/291, 292
 IPC ... B66B 1/302; B66D 1/22,1/225; H02K 51/00, H02K 53/00
 See application file for complete search history.

(56) References Cited

U.S. PATENT DOCUMENTS

| | | | |
|---|---|---|---|
| 483,645 A | 10/1892 | Drake et al. | |
| 538,881 A | 5/1895 | Pink et al. | |
| 555,949 A | 3/1896 | Hennagir | |
| 702,086 A * | 6/1902 | Benner | 185/27 |
| 5,341,902 A * | 8/1994 | Ruiz et al. | 187/251 |
| 6,445,078 B1 | 9/2002 | Cieslak, Jr. | |
| 6,546,726 B1 | 4/2003 | Tomoiu | |
| 6,732,838 B1 * | 5/2004 | Okada et al. | 187/290 |
| 7,104,363 B2 * | 9/2006 | Mori et al. | 187/290 |
| 7,151,322 B2 | 12/2006 | Eskandr | |
| 7,768,142 B2 | 8/2010 | Cieslak, Jr. | |
| 8,344,537 B2 * | 1/2013 | Angulo Valpreda et al. | 290/54 |
| 2004/0113430 A1 | 6/2004 | Clinch | |
| 2004/0130157 A1 | 7/2004 | Naar et al. | |

(Continued)

FOREIGN PATENT DOCUMENTS

KR 2011035619 A 9/2009
WO WO-2004088770 10/2004

OTHER PUBLICATIONS

International Search Report & Written Opinion, Application No. PCT/US2013/056036, Applicant, John Michael Moltion, Mailed Nov. 27, 2013, 9 pages.

(Continued)

*Primary Examiner* — Vanessa Girardi
(74) *Attorney, Agent, or Firm* — Hiscock & Barclay LLP

(57) ABSTRACT

A system for generating electrical power includes a weight assembly coupled to a drive chain that is coupled to a drive mechanism, which is coupled to a rotational mechanism. When the weight assembly is lowered from an elevated position by the force of gravity, the drive chain rotates the drive mechanism, which rotates the rotational mechanism, which rotates the shafts of a power generator mechanism to produce electrical power. After the weight assembly is lowered, a lifting mechanism raises the weight assembly to the elevated position, resetting the system for generating electrical power.

21 Claims, 2 Drawing Sheets

(56) References Cited

U.S. PATENT DOCUMENTS

| | | |
|---|---|---|
| 2004/0178634 A1 | 9/2004 | Eskandr |
| 2006/0163876 A1 | 7/2006 | Eskandr |
| 2007/0012518 A1 | 1/2007 | Gomez-Nacer |
| 2008/0011552 A1 | 1/2008 | La Perle |
| 2008/0315590 A1 | 12/2008 | Reyes-Florido |
| 2009/0115195 A1 | 5/2009 | Wang et al. |
| 2011/0179784 A1 | 7/2011 | Hastings |

OTHER PUBLICATIONS

Power From Gravity, Patent Application No. 1115/MUM/2007, Inventor: Rajesh Mulchandani, http://powerfromgravity.com/invention.aspx, 2 pages.

The Principle of Generation of Electricity Using Gravity, Euler—An Independent Thinker, 8 pages.

Directory: Karra Green Energy: Gravitational Power Generation, http://karragreenenergy.com; 6 pages.

* cited by examiner

LIFTING SYSTEM THAT GENERATES ELECTRICAL POWER

CROSS-REFERENCE TO RELATED APPLICATIONS

This application claims the benefit of and priority to U.S. Provisional Patent Application Ser. No. 61/691,550, filed Aug. 21, 2012, and entitled "POWER STATION," the entirety of which is incorporated herein by reference.

BACKGROUND OF THE INVENTION

The subject matter disclosed herein relates to a system for generating electrical power and, in particular, using the force of gravity as an energy source to generate the electrical power.

The use of clean and renewable sources of energy, including wind, water, solar, etc. has increased in recent years. These alternative energy sources provide certain economic and environmental advantages over traditional sources of energy, including fossil fuels and nuclear energy. However, these alternative energy sources are often expensive to install and maintain, and require a significant amount of space to provide a robust electrical power system. In addition, these alternative energy sources are dependent on often uncontrollable environmental factors (e.g., availability of sun or wind) to generate the required electrical power.

The discussion above is merely provided for general background information and is not intended to be used as an aid in determining the scope of the claimed subject matter.

BRIEF DESCRIPTION OF THE INVENTION

A system for generating electrical power includes a weight assembly coupled to a drive chain that is coupled to a drive mechanism, which is coupled to a rotational mechanism. When the weight assembly is lowered from an elevated position by the force of gravity, the drive chain rotates the drive mechanism, which rotates the rotational mechanism, which rotates the shafts of a power generator mechanism to produce electrical power. After the weight assembly is lowered, a lifting mechanism raises the weight assembly to the elevated position, resetting the system for generating electrical power.

In one embodiment, the system comprises a first drive chain, a weight assembly coupled to the first drive chain, wherein the first drive chain is configured to be pulled in a first direction by the weight assembly as the weight assembly is lowered by the force of gravity from an elevated position, a drive mechanism coupled to the first drive chain, wherein the drive mechanism is configured to be rotated at a first rotational speed in a first rotational direction by the first drive chain as the weight assembly is lowered by the force of gravity, a rotational mechanism coupled to the drive mechanism, wherein the rotational mechanism is configured to be rotated at a second rotational speed by the rotation of the drive mechanism, wherein the second rotational speed is greater than the first rotational speed, a power generation mechanism coupled to the rotational mechanism, wherein a shaft of the power generation mechanism is configured to be rotated at a third rotational speed by the rotation of the rotational mechanism, wherein rotation of the shaft produces electrical power at an output of the power generation mechanism, and a lifting mechanism coupled to the weight assembly, wherein the lifting mechanism is configured to lift the weight assembly to the elevated position after the weight assembly is lowered by the force of gravity.

In another embodiment, the system comprises a first drive chain, a weight assembly coupled to the first drive chain, wherein the first drive chain is configured to be pulled in a first direction by the weight assembly as the weight assembly is lowered by the force of gravity from an elevated position, a drive mechanism coupled to the first drive chain, wherein the drive mechanism is configured to be rotated at a first rotational speed in a first rotational direction by the first drive chain as the weight assembly is lowered by the force of gravity, a pulley system comprising a plurality of pulleys through which the first drive chain is routed between the drive mechanism and the weight assembly, wherein at least one of the plurality of pulleys is coupled to the weight assembly, a second drive chain, a rotational mechanism coupled to the drive mechanism by the second drive chain, wherein the rotational mechanism is configured to be rotated at a second rotational speed by the rotation of the drive mechanism, wherein the second rotational speed is greater than the first rotational speed, a third drive chain, a power generation mechanism coupled to the rotational mechanism by the third drive chain, wherein a shaft of the power generation mechanism is configured to be rotated at a third rotational speed by the rotation of the rotational mechanism, wherein rotation of the shaft produces electrical power at an output of the power generation mechanism, and wherein third rotational speed is greater than the second rotational speed, rechargeable batteries to be charged by the electrical power from the output of the power generation mechanism, a lifting mechanism coupled to the weight assembly, wherein the lifting mechanism is configured to lift the weight assembly to the elevated position after the weight assembly is lowered by the force of gravity, and wherein the electrical power at the output of the power generation mechanism is used to provide electrical power to the lifting mechanism, and a rewinding mechanism, wherein the rewinding mechanism is configured to rotate to pull the first drive chain in a second direction into the rewind mechanism.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
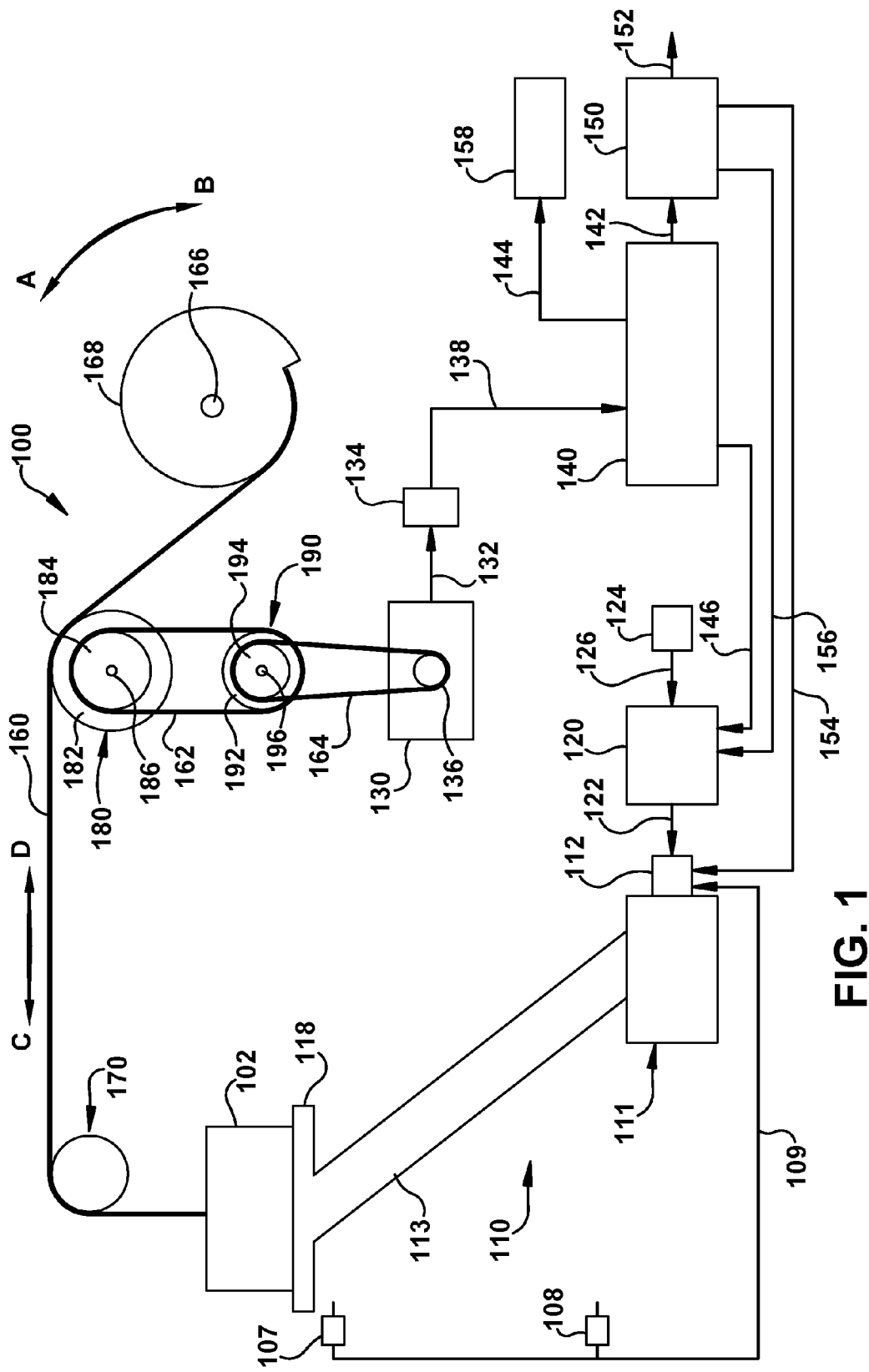
FIG. 1 is diagram of an exemplary system for generating electrical power.
Figure 2:
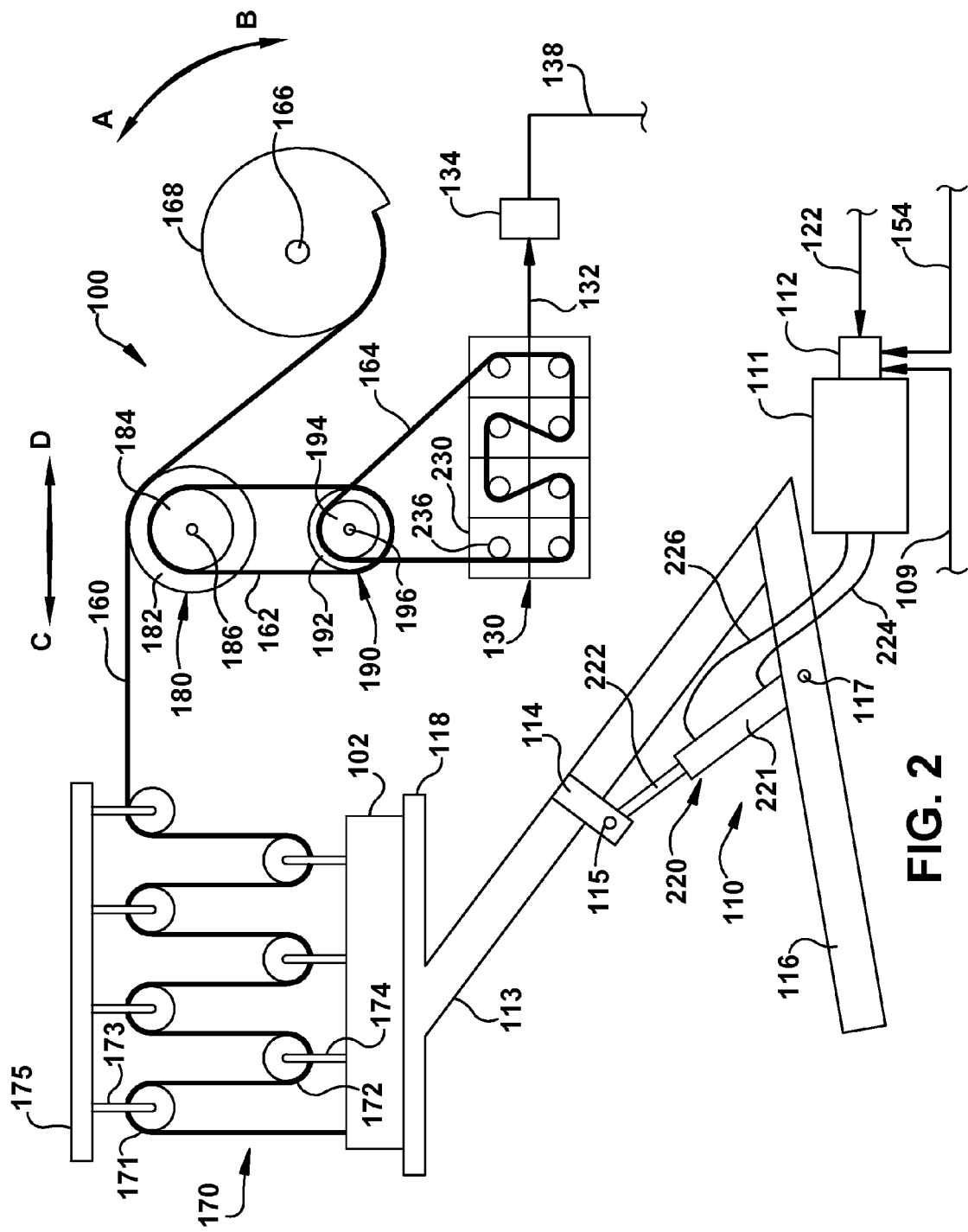
FIG. 2 is a diagram of the exemplary system for generating electrical power of FIG. 1 showing additional details of the system.

FIGS. 1 and 2 are diagrams of an exemplary system 100 for generating electrical power. A weight assembly 102 (e.g., one or more weights) is supported at an elevated position by a lifting mechanism 110. In one embodiment, the lifting mechanism 110 includes a lifting mechanism driver 111 coupled to a lifting arm 113 to raise and release the lifting arm 113 allow it to be lowered by the force of gravity. The distal (first) end of the lifting arm 113 includes a lifting arm platform 118 on which the weight assembly 102 rests. A lifting mechanism driver control switch 112 controls the operation of the lifting mechanism driver 111, determining when the lifting mechanism driver 111 raises, releases, or maintains the position of the lifting arm 113 and the weight assembly 102 located on the lifting arm platform 118.

In one embodiment, a lifting mechanism power source 120 (e.g., a direct current (DC) rechargeable battery) provides electrical power to the lifting mechanism driver 111 via a lifting mechanism power source output 122. In one embodiment, an external power source 124 (e.g., alternating current (AC) electrical power from a utility) can provide electrical power via an external power source output 126 directly to the lifting mechanism driver 111 or indirectly via the lifting mechanism power source 120. As will be explained, the electrical power generated by the inventive system 100 for generating electrical power can be used in lieu of, or in addition to, the external power source 124 to provide electrical power directly to the lifting mechanism driver 111 or indirectly via the lifting mechanism power source 120.

In one embodiment as shown in FIG. 2, the lifting mechanism 110 includes a hydraulic pump as the lifting mechanism driver 111. The hydraulic pump 111 is connected to a hydraulic cylinder 220 via a supply line 224 and a return line 226, which carry hydraulic fluid from the hydraulic pump 111 to drive the hydraulic cylinder 220, which includes a cylinder barrel 221 and a piston rod 222 extending from the distal (first) end of the cylinder barrel 221. In one embodiment, the proximate (second) end of the cylinder barrel 221 is rotatably coupled to a support arm axle 117 attached to a stationary support arm 116 for the lifting mechanism 110. Similarly, the distal (first) end of the piston rod 222 is rotatably coupled to a lifting arm axle 115 attached to a lifting arm bracket 114 mounted on the lifting arm 113.

When the lifting mechanism driver (hydraulic pump) 111 is controlled to release (and allow lowering of) the lifting arm 113 (e.g., by removing electrical power from the hydraulic pump 111), the hydraulic fluid is removed from the cylinder barrel 221 of the hydraulic cylinder 220 causing the piston rod 222 to retract into the cylinder barrel 221. The retracting of the piston rod 222 allows lowering the lifting arm 113 and the weight assembly 102 by the force of gravity. In the illustrated embodiment, the lifting arm 113 and the hydraulic cylinder 220 are rotated in the counterclockwise (first rotational) direction A as the lifting arm is lowered. Conversely, when the lifting mechanism driver (hydraulic pump) 111 is controlled to raise the lifting arm 113 (e.g., by providing electrical power to the hydraulic pump 111), the hydraulic fluid is pumped into the cylinder barrel 221 of the hydraulic cylinder 220 causing the piston rod 222 to extend from the cylinder barrel 221. The forcible extension of the piston rod 222 raises the lifting arm 113 and the weight assembly 102. In the illustrated embodiment, the lifting arm 113 and the hydraulic cylinder 220 are rotated in the clockwise (second rotational) direction B as the lifting arm is raised. It will be understood that other lifting mechanisms 110 other than those involving a lifting arm 113 and hydraulic pump 111 can be used, including a winch system coupled to a chain to raise and lower the weight assembly 102.

In one embodiment, the lifting mechanism driver control switch 112 can receive switch outputs 109 from an upper (first) switch 107 and a lower (second) switch 108 that are configured to detect the position of the lifting arm 113 and/or the weight assembly 102. For example, if the lifting arm 113 is located at an elevated position as shown in FIG. 1, the upper switch 107 can send a signal via the switch outputs 109 to the lifting mechanism driver control switch 112 to have the lifting mechanism driver 111 release the lifting arm 113 and allow lowering of the weight assembly 102 by the force of gravity. Similarly, if the lifting arm 113 is located at a lowered position, the lower switch 108 can send a signal via the switch outputs 109 to the lifting mechanism driver control switch 112 to have the lifting mechanism driver 111 raise the lifting arm 113. It will be understood that various switching mechanisms can be used to control operation of the lifting mechanism driver 111, including a timer mechanism that could allow the lifting arm 113 to be lowered by the force of gravity for a period of time and then raise the lifting arm 113 for a period of time.

As can be seen in FIGS. 1 and 2, a primary (first) drive chain 160 is coupled to the weight assembly 102. In one embodiment, the first drive chain 160 is attached directly to the weight assembly 102, while in other embodiments, the first drive chain 160 is attached indirectly to the weight assembly 102 through another object that is coupled to the weight assembly 102 (e.g., attached to the lifting arm platform 118). It will be understood that the term "drive chain" as used herein is not limited to a chain structure, but instead is broad enough to include all roller chains, cables, ropes, belts, or similar devices used in pulley, sprocket, or similar rotational systems.

As can be seen in FIGS. 1 and 2, as the weight assembly 102 and lifting arm 113 are lowered from an elevated position by the force of gravity, the first drive chain 160 is pulled in a first direction C and lowered along with the weight assembly 102. In one embodiment, the first drive chain 160 engages with a drive mechanism 180 causing the drive mechanism 180 to rotate in a counterclockwise (first rotational) direction A. For example, the first drive chain 160 can engage with the teeth of a drive mechanism first sprocket wheel 182. As will be explained, the rotation of the drive mechanism first sprocket wheel 182 in a counterclockwise (first rotational) direction A causes corresponding rotation of a rotational mechanism 190, which rotates power generator mechanism shafts 136 of a power generator mechanism 130 to produce electrical power. Given this arrangement, the longer the time that the first drive chain 160 rotates the drive mechanism first sprocket wheel 182 as the weight assembly 102 is lowered by the force of gravity, the longer the time that the power generator mechanism shafts 136 of the power generator mechanism 130 are rotated to produce electrical power. In order to increase this length of time, the vertical distance that the weight assembly 102 can be lowered can be increased and/or a pulley system 170 can be used to increase the length of the first drive chain 160 that will engage with and rotate the drive mechanism first sprocket wheel 182 as the weight assembly 102 is lowered.

As shown in FIGS. 1 and 2, the pulley system 170 includes a first set of (upper) pulleys 171 (e.g., four upper pulleys) and a second set of (lower) pulleys 172 (e.g., three lower pulleys) through which the first drive chain 160 is routed between the drive mechanism 180 and the weight assembly 102. In another embodiment, one or more of the first set of (upper) pulleys 171 can be replaced with sprocket wheels. The axles of the upper pulleys 171 are coupled to an upper pulley mounting block 175 with upper pulley supports 173, while the axles of the lower pulleys 172 are coupled to the weight assembly 102 with lower pulley supports 174. The first drive chain 160 is routed through the pulley system 170 alternating between a pulley from the upper pulleys 171 and a pulley from the lower pulleys 172.

As can be seen in FIG. 2, by using a pulley system 170 with a plurality of pulleys 171, 172 rather than a single pulley, the length of the first drive chain 160 that will engage with and rotate the drive mechanism first sprocket wheel 182 as the weight assembly 102 is lowered is increased by several times. In the exemplary pulley system 170 shown in FIG. 2, the length with be increased by seven times. For example, if the weight assembly 102 is lowered 2 meters from its elevated position (shown in FIGS. 1 and 2) to its lowered position, the first drive chain 160 will be pulled a total of 14 meters since there are 7 individual portions of first drive chain 160 extending in the pulley system 170. It will be understood that different configurations of pulley systems can be used, including pulley systems with only a single pulley if it is not necessary to extend the length of the first drive chain 160.

In order to store the excess first drive chain 160 when the weight assembly 102 is in its elevated position and to rewind the first drive chain 160 as the weight assembly 102 is raised to its elevated position, as shown in the exemplary embodiment of FIGS. 1 and 2, the system 100 also includes a rewind mechanism 168 (e.g., similar to a hose rewinder) that rotates on an rewind mechanism axle 166. For example, the rewind mechanism 168 is biased to rotate around the rewind mechanism axle 166 in a counterclockwise (first rotational) direction A to pull the first drive chain 160 in a second direction D into the rewind mechanism 168. In another embodiment, the rewind mechanism 168 can be biased to rotate around the rewind mechanism axle 166 in a clockwise (second rotational) direction B to pull the first drive chain 160 in a second direction D into the rewind mechanism 168.

During the raising and rewinding process, the drive mechanism first sprocket wheel 182 is rotated in the clockwise (second rotational) direction B. In one embodiment, a clutch mechanism can be installed as part of the drive mechanism 180 to disconnect the drive mechanism first sprocket wheel 182 from the drive mechanism axle 186 when the drive mechanism first sprocket wheel 182 is rotated in a clockwise (second rotational) direction B, preventing rotation of the drive mechanism axle 186. The disconnection of the drive mechanism first sprocket wheel 182 from the drive mechanism axle 186 prevents rotation of the rotational mechanism 190 during the raising and rewinding processes.

As discussed previously with respect to the exemplary embodiment, when the weight assembly 102 is lowered from an elevated position by the force of gravity, the first drive chain 160 engages with the teeth of the drive mechanism first sprocket wheel 182 causing rotation in a counterclockwise (first rotational) direction A. When the drive mechanism first sprocket wheel 182 is rotated in a counterclockwise (first rotational) direction A, the drive mechanism first sprocket wheel 182 engages with the drive mechanism axle 186. Since the drive mechanism axle 186 is coupled to a drive mechanism second sprocket wheel 184 on the drive mechanism 180 (e.g., the drive mechanism axle 186 is welded to the drive mechanism second sprocket wheel 184), when the drive mechanism first sprocket wheel 182 is rotated in a counterclockwise (first rotational) direction A during lowering of the weight assembly 102, the drive mechanism second sprocket wheel 184 will also rotate in counterclockwise (first rotational) direction A during lowering of the weight assembly 102. As will be explained, this drive mechanism second sprocket wheel 184 is coupled to the rotational mechanism 190 (e.g., via a second drive chain 162) to provide the rotation that will be used to rotate the power generator mechanism shafts 136 of a power generator mechanism 130 to produce electrical power.

As seen in FIGS. 1 and 2, a second drive chain 162 couples the drive mechanism second sprocket wheel 184 to a rotational mechanism first sprocket wheel 192 of the rotational mechanism 190, transmitting the rotation of the drive mechanism 180 to the rotational mechanism 190. Accordingly, the first sprocket wheel 192 of the rotational mechanism 190 will rotate in a counterclockwise (first rotational) direction A during lowering of the weight assembly 102. It should be noted that in a different rotational system (e.g., using gears instead of drive chains and sprocket wheels), the first sprocket wheel 192 of the rotational mechanism 190 may rotate in a clockwise (second rotational) direction B during lowering of the weight assembly 102 (i.e., opposite of the rotation of the driving mechanism 180).

In one embodiment, the rotational mechanism first sprocket wheel 192 can have a smaller diameter and smaller number of teeth than the drive mechanism second sprocket wheel 184 to increase the rotational speed (i.e., revolutions per minute (RPM)) of the rotational mechanism 190 as compared to the rotational speed of the driving mechanism 180. It will be understood that the sizes of the drive mechanism 180 and rotational mechanism 190 and their corresponding sprocket wheels shown in FIGS. 1 and 2 are not to scale and not proportional, but have been illustrated merely to show the inventive concepts. For example, the drive mechanism first sprocket wheel 182 can be a larger diameter and have a larger number of teeth than the drive mechanism second sprocket wheel 184 or vice versa. It will also be understood that each of the drive mechanism 180 and the rotational mechanism 190 can include several sprocket wheels to provide the necessary rotation. In addition, it will be understood that the drive mechanism 180 and the rotational mechanism 190 can include sprocket wheels only, gears (meshed) only, or a combination or sprocket wheels and gears to provide the necessary rotation. For example, the rotational mechanism 190 can be coupled to the drive mechanism 180 by a gear train.

In one embodiment, the rotational mechanism first sprocket wheel 192 is coupled to the rotational mechanism axle 196 (e.g., the two are welded together), which transmits the rotation of the rotational mechanism first sprocket wheel 192 to a rotational mechanism second sprocket wheel 194. As shown in FIGS. 1 and 2, this rotational mechanism second sprocket wheel 194 is coupled to the power generator mechanism shafts 136 of a power generator mechanism 130 (e.g., via a third drive chain 164) to produce electrical power at the power generator mechanism output 132. In one embodiment, each of the shafts have sprocket wheels coupled to the third drive chain 164. In one embodiment, the rotational speed of the shafts 136 of the power generator mechanism 130 is greater than the rotational speed of the rotational mechanism 190.

In one embodiment, the power generator mechanism 130 includes a plurality of alternators 230 each with alternator shafts 236 that, when rotated, cause the alternators 230 to produce alternating current (AC) electrical power at the power generator mechanism output 132. It will be understood that various power generator mechanisms 130 can be used in the system 100, including alternators, generators, pumps, etc. In addition, it will be understood that different numbers of power generator mechanisms 130 can be used in the system 100 depending on the electrical power required as the system 100 is easily scalable.

In one embodiment and as shown in FIGS. 1 and 2, where the power generator mechanism output 132 is alternating current (AC) electrical power, the output 132 is input to a AC-DC rectifier 134 to convert the alternating current (AC) electrical power to direct current (DC) electrical power at the rectifier output 138. The direct current (DC) electrical power at the AC-DC rectifier output 138 is used to (trickle) charge a plurality of rechargeable batteries 140 (e.g., six 12V DC deep cell batteries). In one embodiment, the rechargeable batteries primary output 142 is connected to a DC-AC inverter 150 for converting the direct current (DC) electrical power to alternating current (AC) electrical power. The rechargeable batteries overflow output 144 can be connected to a dump load resistor 158 or similar device to receive excess charging power from the rechargeable batteries 140. In one embodiment, the rechargeable batteries secondary output 146 can be used to provide power to the lifting mechanism power source 120 (e.g., a direct current (DC) rechargeable battery), which provides electrical power to the lifting mechanism driver 111 via a lifting mechanism power source output 122. This rechargeable batteries secondary output 146 can be used in lieu of, or in addition to, the external power source 124 to provide electrical power directly to the lifting mechanism driver 111 or indirectly via the lifting mechanism power source 120.

The DC-AC inverter AC primary output 152 provides alternating current (AC) electrical power for use in, e.g., a residential home or commercial business. The DC-AC inverter AC secondary output 156 can be used to provide power to the lifting mechanism power source 120 (e.g., if it is an AC source), which provides electrical power to the lifting mechanism driver 111 via a lifting mechanism power source output 122. This DC-AC inverter AC secondary output 156 can be used in lieu of, or in addition to, the external power source 124 to provide electrical power directly to the lifting mechanism driver 111 or indirectly via the lifting mechanism power source 120. It will be understood the electrical distributions system for the electrical power generated by the system 100 can include various components not shown in the figures, including panels, switches, bus bars, etc.

In one embodiment, the DC-AC inverter 150 can monitor the charged level of the recyclable batteries 140 and determine what actions need to be taken if the level goes below or above a certain threshold. For example, if the charged level of the recyclable batteries 140 falls below 40% of maximum charge, the DC-AC inverter 150 can send a signal via the DC-AC inverter charging control output 154 to the lifting mechanism driver control switch 112 to have the lifting mechanism driver 111 begin the power generation (e.g., raise the lifting arm 113). Similarly, if the charged level of the recyclable batteries 140 goes above 90% of maximum charge, the DC-AC inverter 150 can send a signal via the DC-AC inverter charging control output 154 to the lifting mechanism driver control switch 112 to have the lifting mechanism driver 111 disable the power generation (e.g., disable movement of the lifting arm 113).

In tests of an exemplary system 100, it was determined that a total of 14.4 watts were required from a lifting mechanism power source 120 (e.g., a direct current (DC) rechargeable battery) to power the lifting mechanism driver (hydraulic pump) 111 to lift the weight assembly 102 to its maximum elevated position (and lift the lifting arm 113 and lifting arm platform 118), which took approximately 4 seconds of time. In those same tests, using 5 alternators (Wind Blue Power Model #DC-540 Low Wind Permanent Magnet Alternator) as the power generator mechanism 130, the power generated by the power generator mechanism 130 the system 100 as the weight assembly 102 was lowered by the force of gravity was 280 Watts, which took approximately 29 seconds. This test data confirms that, since more electrical power is generated by the power generator mechanism 130 while the weight assembly 102 falls that the electrical power required to raise the weight assembly 102 again, the system 100 can be continuously powered without any external source of power as a self-contained system and generate electrical power for use by a user (e.g., residential home, commercial business, military, etc.).

An advantage that may be realized in the practice of some disclosed embodiments of the system for generating electrical power is that the system can be sized small enough to be installed in residential locations. The system can also be installed as a portable unit for use when no publicly available energy sources are present, including in underprivileged areas and third-world countries. Another advantage is that the system does not require any natural resources (e.g., fossil fuels, trees, dependence on foreign countries for fuel) and has no negative environmental impacts (e.g., no exhaust gases, no pollution, no outdoor power lines. The system can also be installed in tall buildings with individual units powering one or more floors and elevator shafts or equivalent vertical rises used for the travel of the weights in the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating electrical power, the system comprising:
    a first drive chain;
    a weight assembly coupled to the first drive chain, wherein the first drive chain is configured to be pulled in a first direction by the weight assembly as the weight assembly is lowered by the force of gravity from an elevated position;
    a drive mechanism coupled to the first drive chain, wherein the drive mechanism is configured to be rotated at a first rotational speed in a first rotational direction by the first drive chain as the weight assembly is lowered by the force of gravity;
    a rotational mechanism coupled to the drive mechanism, wherein the rotational mechanism is configured to be rotated at a second rotational speed by the rotation of the drive mechanism, wherein the second rotational speed is greater than the first rotational speed;

a power generation mechanism coupled to the rotational mechanism, wherein a shaft of the power generation mechanism is configured to be rotated at a third rotational speed by the rotation of the rotational mechanism, wherein rotation of the shaft produces electrical power at an output of the power generation mechanism; and a lifting mechanism coupled to the weight assembly, wherein the lifting mechanism comprises:

a lifting arm having a first end and a second end, wherein the lifting arm is configured to raise the weight assembly;

a lifting platform on the first end of the lifting arm configured for receiving the weight assembly, the lifting mechanism is configured to lift the weight assembly to the elevated position after the weight assembly is lowered by the force of gravity.

2. The system of claim 1, further comprising a pulley system comprising a plurality of pulleys through which the first drive chain is routed between the drive mechanism and the weight assembly, wherein at least one of the plurality of pulleys is coupled to the weight assembly.

3. The system of claim 1, further comprising a rewind mechanism, the drive mechanism being disposed between the weight assembly and the rewind mechanism, wherein the rewind mechanism is configured to rotate to pull the first drive chain in a second direction into the rewind mechanism, the rewind mechanism being coupled to the drive mechanism such that movement of the first drive chain in both the first direction and the second direction is coupled to movement of the rewind mechanism in both an unwinding rotational direction and a winding rotational direction, respectively, wherein the rewind mechanism is biased in favor of the winding rotational direction.

4. The system of claim 1, wherein the rotational mechanism is coupled to the drive mechanism by a gear train.

5. The system of claim 1, wherein the third rotational speed is greater than the second rotational speed.

6. The system of claim 1, wherein the electrical power at the output of the power generation mechanism is used to provide electrical power to the lifting mechanism.

7. The system of claim 1, further comprising rechargeable batteries to be charged by the electrical power from the output of the power generation mechanism.

8. The system of claim 7, further comprising a rectifier for converting an alternating current electrical power output of the power generation mechanism to direct current electrical power for charging the rechargeable batteries.

9. The system of claim 7, further comprising an inverter for converting a direct current electrical power output of the rechargeable batteries to alternating current electrical power.

10. The system of claim 1, wherein the first drive chain is a roller chain.

11. The system of claim 10, wherein the drive mechanism comprises a drive mechanism first sprocket wheel coupled to the roller chain.

12. The system of claim 11, further comprising a second drive chain, wherein the drive mechanism comprises a drive mechanism second sprocket wheel, and the rotational mechanism comprises a rotational mechanism first sprocket wheel, and the second drive chain couples the drive mechanism second sprocket wheel to the rotational mechanism first sprocket wheel.

13. The system of claim 12, further comprising a third drive chain, wherein the rotational mechanism comprises a rotational mechanism second sprocket wheel, and the third drive chain couples the rotational mechanism second sprocket wheel to the shaft of the shaft of the power generation mechanism.

14. A system for generating electrical power, the system comprising:

a first drive chain;

a weight assembly coupled to the first drive chain, wherein the first drive chain is configured to be pulled in a first direction by the weight assembly as the weight assembly is lowered by the force of gravity from an elevated position;

a drive mechanism coupled to the first drive chain, wherein the drive mechanism is configured to be rotated at a first rotational speed in a first rotational direction by the first drive chain as the weight assembly is lowered by the force of gravity;

a rotational mechanism coupled to the drive mechanism, wherein the rotational mechanism is configured to be rotated at a second rotational speed by the rotation of the drive mechanism, wherein the second rotational speed is greater than the first rotational speed;

a power generation mechanism coupled to the rotational mechanism, wherein a shaft of the power generation mechanism is configured to be rotated at a third rotational speed by the rotation of the rotational mechanism, wherein rotation of the shaft produces electrical power at an output of the power generation mechanism; and a lifting mechanism coupled to the weight assembly, wherein the lifting mechanism is configured to lift the weight assembly to the elevated position after the weight assembly is lowered by the force of gravity;

wherein the lifting mechanism comprises:

a lifting arm having a first end and a second end, wherein the lifting arm is configured to raise the weight assembly;

a lifting platform on the first end of the lifting arm configured for receiving the weight assembly;

a stationary support arm;

a hydraulic cylinder comprising a cylinder barrel and a piston rod, wherein the cylinder barrel is rotatably coupled to the stationary support arm and the piston rod is rotatably coupled to the lifting arm; and a hydraulic pump for pumping hydraulic fluid to the hydraulic cylinder to extend the piston rod and raise the lifting arm and lifting platform.

15. The system of claim 14, wherein the rotational mechanism is coupled to the drive mechanism by a gear train.

16. The system of claim 14, wherein the first drive chain is a roller chain.

17. The system of claim 16, wherein the drive mechanism comprises a drive mechanism first sprocket wheel coupled to the roller chain.

18. The system of claim 17, further comprising a second drive chain, wherein the drive mechanism comprises a drive mechanism second sprocket wheel, and the rotational mechanism comprises a rotational mechanism first sprocket wheel, and the second drive chain couples the drive mechanism second sprocket wheel to the rotational mechanism first sprocket wheel.

19. The system of claim 18, further comprising a third drive chain, wherein the rotational mechanism comprises a rotational mechanism second sprocket wheel, and the third drive chain couples the rotational mechanism second sprocket wheel to the shaft of the shaft of the power generation mechanism.

20. A system for generating electrical power, the system comprising:
- a first drive chain;
- a weight assembly coupled to the first drive chain, wherein the first drive chain is configured to be pulled in a first direction by the weight assembly as the weight assembly is lowered by the force of gravity from an elevated position;
- a drive mechanism coupled to the first drive chain, wherein the drive mechanism is configured to be rotated at a first rotational speed in a first rotational direction by the first drive chain as the weight assembly is lowered by the force of gravity;
- a pulley system comprising a plurality of pulleys through which the first drive chain is routed between the drive mechanism and the weight assembly, wherein at least one of the plurality of pulleys is coupled to the weight assembly;
- a second drive chain;
- a rotational mechanism coupled to the drive mechanism by the second drive chain, wherein the rotational mechanism is configured to be rotated at a second rotational speed by the rotation of the drive mechanism, wherein the second rotational speed is greater than the first rotational speed;
- a third drive chain;
- a power generation mechanism coupled to the rotational mechanism by the third drive chain, wherein a shaft of the power generation mechanism is configured to be rotated at a third rotational speed by the rotation of the rotational mechanism, wherein rotation of the shaft produces electrical power at an output of the power generation mechanism, and wherein third rotational speed is greater than the second rotational speed;
- rechargeable batteries to be charged by the electrical power from the output of the power generation mechanism;
- a lifting mechanism coupled to the weight assembly, wherein the lifting mechanism comprises:
- a lifting arm having a first end and a second end, wherein the lifting arm is configured to raise the weight assembly;
- a lifting platform on the first end of the lifting arm configured for receiving the weight assembly, the lifting mechanism is configured to lift the weight assembly to the elevated position after the weight assembly is lowered by the force of gravity, and wherein the electrical power at the output of the power generation mechanism is used to provide electrical power to the lifting mechanism; and
- a rewinding mechanism, wherein the rewinding mechanism is configured to rotate to pull the first drive chain in a second direction into the rewind mechanism.

21. The system of claim 20, wherein the lifting mechanism further comprises:
- a stationary support arm;
- a hydraulic cylinder comprising a cylinder barrel and a piston rod, wherein the cylinder barrel is rotatably coupled to the stationary support arm and the piston rod is rotatably coupled to the lifting arm; and
- a hydraulic pump for pumping hydraulic fluid to the hydraulic cylinder to extend the piston rod and raise the lifting arm and lifting platform.

* * * * *